B. FRANKENFIELD.
DYNAMO ELECTRIC MACHINE.
APPLICATION FILED APR. 15, 1910

1,023,511. Patented Apr. 16, 1912.

Witnesses
Rob. E. Scott
Chas. L. Byron

Inventor
Budd Frankenfield
By Chas. E. Lord
Attorney

UNITED STATES PATENT OFFICE.

BUDD FRANKENFIELD, OF LOS ANGELES, CALIFORNIA, ASSIGNOR TO ALLIS-CHALMERS COMPANY, A CORPORATION OF NEW JERSEY.

DYNAMO-ELECTRIC MACHINE.

1,023,511.   Specification of Letters Patent.   Patented Apr. 16, 1912.

Application filed April 15, 1910. Serial No. 555,588.

*To all whom it may concern:*

Be it known that I, BUDD FRANKENFIELD, a citizen of the United States, residing at Los Angeles, in the county of Los Angeles and State of California, have invented certain new and useful Improvements in Dynamo-Electric Machines, of which the following is a full, clear, and exact specification.

My invention relates to dynamo-electric machines.

It has been observed that in machines having series windings there is a magnetizing effect upon the shaft. This effect is due to the fact that the series winding in going from pole to pole makes one or more turns around the shaft. In heavy current machines one such turn carrying the full current of the machine produces a very marked effect. Suppose, for instance, that a machine supplies 10,000 amperes; because of this one turn there are then 10,000 ampere turns. The resultant magnetization of the shaft is undesirable, particularly at and near the bearings.

It is the object of my present invention to reduce or entirely prevent such magnetization of the shaft. This is accomplished by arranging the series windings and their interconnections so that there is an equal number of ampere turns, as near as may be, around the shaft in each direction. In one convenient embodiment of my invention there is an even number of turns around the shaft, the current in one half of these turns circulating around the shaft in one direction and this same current in the other half circulating around the shaft in the opposite direction. Preferably there is one turn in each direction.

The various novel features of my invention will appear from the description and drawings, and will be particularly pointed out in the claims.

Figure 1:
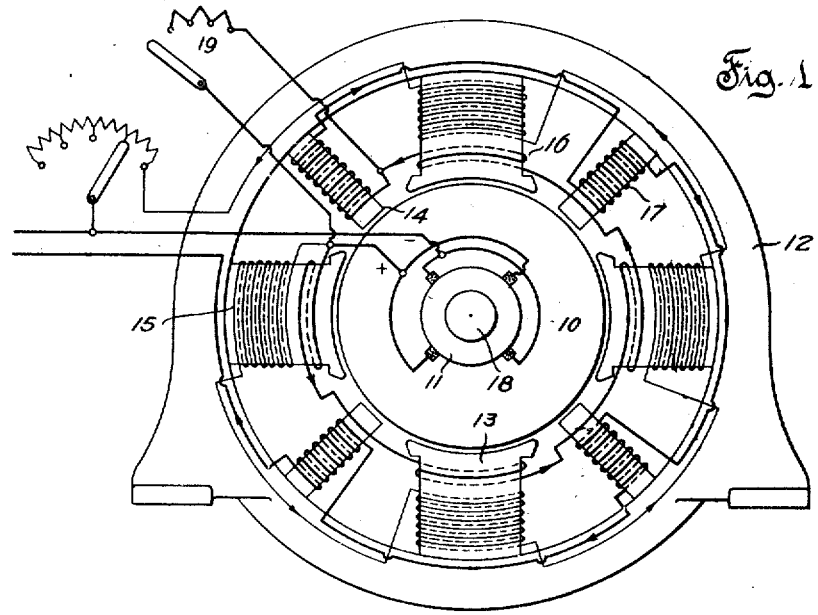
Figure 2:
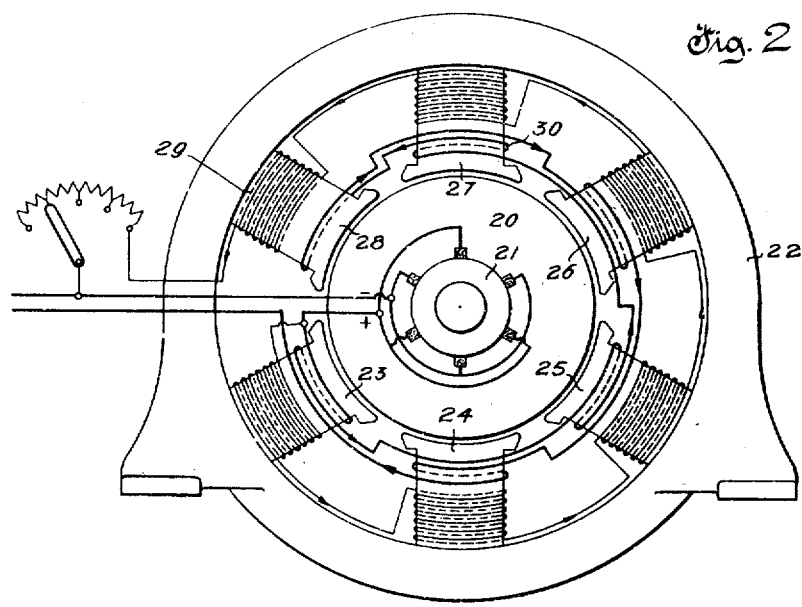

Figure 1 shows my invention as applied to a compound wound machine provided with series wound commutating poles; and, Fig. 2 shows the invention as applied to a compound wound machine without commutating poles.

The machine shown in Fig. 1 is a four pole machine having an armature 10, a commutator 11, and a field frame 12 provided with main poles 13 and commutating poles 14. The main poles are provided with shunt windings 15 and series windings 16. The commutating poles 14 are provided with series windings 17. The series circuit extends from the positive brushes, through the series windings 16 on the four main poles 13, and the series windings 17 on the several commutating poles, to the line, thence returning to the negative brushes. The connections from pole to pole in the main windings 16 extend in a counter-clockwise direction around the shaft 18, whereas the connections from pole to pole of the commutating windings 17 extend from pole to pole in a clockwise direction around the shaft, so that as a result the effects of the two turns around the shaft neutralize each other and no magnetization in the shaft is produced.

In case either the main series winding or the commutating series winding is shunted, it may be inconvenient to arrange to obtain exact neutralization of the effects produced by the turns around the shaft in the opposite directions. For instance, if the main series winding is shunted, as by a series shunt or by a rheostat 19, it may sometimes be inconvenient to have the connections for such series shunt or rheostat pass around the shaft in the same direction as does the main series winding which it shunts. It should not, however, make a turn around the shaft in the other direction. In that case the number of ampere turns around the shaft due to one set of interconnections may exceed those due to the other set of interconnections, but in most cases magnetization to this extent will not be greatly undesirable.

Fig. 2 is a six pole machine having an armature 20, a commutator 21, and a field frame 22 provided with six field poles 23, 24, 25, 26, 27, and 28. These field poles have shunt field windings 29 and series field windings 30. The series connections extend from the positive brush in a counter-clockwise direction around the shaft through the series field coils on the poles 23, 25, and 27 successively, and then in a clockwise direction around the shaft through the series field coils on the poles 28, 26, and 24 successively. The two turns around the shaft, having equal currents in opposite directions, neutralize each other's effects and produce no magnetization in the shaft itself.

There are many other specific arrangements for carrying out my invention, the exact arrangement which is used depending largely upon the judgment of the designer. The aim is to arrange for an equal number of ampere turns, as nearly as may be, around the shaft in each direction. As stated above, exact equality is not always conveniently obtainable. The broad scope of my invention includes the idea of neutralizing partly or wholly the ampere turns around the shaft in one direction by ampere turns around the shaft in the other direction.

The invention is applicable to all classes of machines having series windings, whether or not they have shunt windings and whether they are generators or motors. In the following claims I aim to cover all modifications which do not depart from the spirit and scope of my invention.

What I claim as new is:

1. In a dynamo-electric machine, a field member having a plurality of main poles and a plurality of commutating poles, series windings on both sets of poles, interconnections between the series windings on the main poles arranged to carry current around the axis of rotation of the machine in one direction, and interconnections between the series windings on the commutating poles arranged to carry current around such axis in the other direction.

2. In a dynamo-electric machine, a field member having a plurality of main poles, and a plurality of commutating poles, series windings on both sets of poles, interconnections between the series windings on the main poles which with said windings produce a number of ampere turns around the axis of rotation of the machine in one direction, and interconnections between the series windings on the commutator poles which with said windings produce a number of ampere turns around such axis in the other direction.

Milwaukee, Wis., March 22, 1910.

In testimony whereof I affix my signature, in the presence of two witnesses.

BUDD FRANKENFIELD.

Witnesses:
  C. E. FISH,
  J. H. HANNA.